(12) United States Patent
Lahm

(10) Patent No.: US 9,376,016 B2
(45) Date of Patent: Jun. 28, 2016

(54) METHOD AND APPARATUS FOR INDICATING A DRIVING MODE CHANGE TO A DRIVER BY IDLE VEHICLE TRAVEL

(71) Applicant: Dr. Ing. h.c. F. Porsche Aktiengesellschaft, Stuttgart (DE)

(72) Inventor: Siegfried Lahm, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/020,147

(22) Filed: Sep. 6, 2013

(65) Prior Publication Data
US 2014/0081501 A1    Mar. 20, 2014

(30) Foreign Application Priority Data

Sep. 14, 2012  (DE) .......... 10 2012 108 589

(51) Int. Cl.
*B60K 26/02* (2006.01)
*F02D 11/02* (2006.01)
*F02D 11/10* (2006.01)
*G05G 5/03* (2008.04)
*B60K 6/48* (2007.10)
*F02D 41/00* (2006.01)

(52) U.S. Cl.
CPC .............. *B60K 26/021* (2013.01); *F02D 11/02* (2013.01); *F02D 11/105* (2013.01); *G05G 5/03* (2013.01); *B60K 6/48* (2013.01); *F02D 11/106* (2013.01); *F02D 41/0087* (2013.01); *F02D 2011/102* (2013.01); *F02D 2200/602* (2013.01); *Y02T 10/6221* (2013.01); *Y10S 903/902* (2013.01)

(58) Field of Classification Search
CPC .......... F02D 11/02; F02D 11/105; G05G 5/03
See application file for complete search history.

(56) References Cited

U.S. PATENT DOCUMENTS

| 6,350,217 | B1 | 2/2002 | Unterforsthuber | |
|---|---|---|---|---|
| 7,699,129 | B2 | 4/2010 | Treharne et al. | |
| 7,971,506 | B2 | 7/2011 | Dickinson | |
| 2009/0030582 | A1* | 1/2009 | Jacobi et al. | 701/51 |
| 2011/0106353 | A1* | 5/2011 | Brocke et al. | 701/22 |
| 2012/0078467 | A1 | 3/2012 | Schweikl et al. | |
| 2012/0078468 | A1* | 3/2012 | Popp et al. | 701/36 |
| 2012/0323401 | A1* | 12/2012 | McGrogan | 701/1 |

FOREIGN PATENT DOCUMENTS

| DE | 10 2007 011 739 | | 9/2008 | |
|---|---|---|---|---|
| DE | 102007011739 | * | 9/2008 | .......... B60K 26/021 |
| DE | 10 2008 000 577 | | 9/2009 | |
| DE | 102009021662 | | 11/2010 | |
| DE | 102009054872 | | 6/2011 | |
| DE | 10 2010 039 377 | | 2/2012 | |
| WO | 2010/052236 | | 5/2010 | |

* cited by examiner

Primary Examiner — Mussa A Shaawat
Assistant Examiner — Kelly D Williams
(74) Attorney, Agent, or Firm — Gerald E. Hespos; Michael J. Porco; Matthew T. Hespos

(57) ABSTRACT

A method is provided for operating a motor vehicle having at least one drive unit in the form of an internal combustion engine that is actuated by an accelerator pedal and a control unit that interacts with the accelerator pedal. Haptic feedback on the accelerator pedal indicates to a driver that a defined action causing a change in the driving mode is about to be initiated and carried out. The haptic feedback is realized as idle travel defined in a characteristic curve stored in the control unit of the accelerator pedal proceeding from the specific accelerator pedal travel.

14 Claims, 3 Drawing Sheets

METHOD AND APPARATUS FOR INDICATING A DRIVING MODE CHANGE TO A DRIVER BY IDLE VEHICLE TRAVEL

CROSS REFERENCE TO RELATED APPLICATION

This application claims priority under 35 USC 119 to German Patent Appl. No. 10 2012 108 589.7 filed on Sep. 14, 2012, the entire disclosure of which is incorporated herein by reference.

BACKGROUND

1. Field of the Invention

The invention relates to a method for operating a motor vehicle having at least one drive unit in the form of an internal combustion engine. The invention also relates to a corresponding apparatus.

2. Description of the Related Art

A drive of a motor vehicle is generally actuated by an accelerator pedal with which an engine power is controlled. In modern vehicles, it has become customary to design the accelerator pedal as an electronic accelerator pedal or E-gas for short. Thus, the accelerator pedal no longer acts on the drive unit mechanically directly by means of a linkage or cable, but rather by means of an engine control means. In this case, a sensor is provided and informs a corresponding control unit of the engine control means of an acceleration or driver command made by the driver. This sensor also is called a pedal value transmitter. The sensor transmits an accelerator pedal position, an accelerator pedal angle or an accelerator pedal travel to the control unit generally analogously in the form of voltage values.

The accelerator pedal sensor generally is equipped with two resistors or potentiometers with different operating ranges and separate lines.

Accelerator pedals have a defined pedal force/pedal travel characteristic curve. In the case of a hybrid vehicle, a changeover is made from an electric driving mode to driving using an internal combustion engine without the driver being able to identify this changeover when pressing the accelerator pedal. Therefore, in the case of a hybrid vehicle, purely electric driving is virtually impossible to achieve by deliberate operation of the accelerator pedal.

U.S. Pat. No. 7,699,129 B2 discloses an accelerator pedal that provides a driver with feedback when a motor is being started. This feedback in the form of a sudden increase in return force is coupled with a threshold position of the accelerator pedal.

U.S. Pat. No. 7,971,506 B2 discloses an adaptable position-kickdown locking mechanism to provide a driver of a motor vehicle with force feedback by virtue of an accelerator pedal of an E-gas system before a transition is made to kickdown.

DE 10 2010 039 377 A1 discloses a method for operating a drive train of a motor vehicle. The drive train comprises a drive assembly in the form of a hybrid drive with an internal combustion engine and an electrical machine. A transmission is connected between the drive assembly and a drive. Furthermore, the internal combustion engine can be decoupled from the drive and stopped in the event of purely electric driving by the electrical machine. A time for starting the internal combustion engine with the aid of the electrical machine is determined as a function of operating parameters of the drive train. The imminent starting of the internal combustion engine with the aid of the electrical machine is announced haptically to a driver by the buildup of a counterpressure on an accelerator pedal.

DE 10 2007 011 739 A1 discloses a hybrid motor vehicle with a drive unit that can be operated both jointly and individually to generate drive torque. A device also is provided for prespecifying a driver command. The device is formed so that a force stage with an increased return force is present within the adjustment range of the device.

DE 10 2008 000 577 A1 discloses a method for operating a vehicle having a hybrid drive so that the driver is informed about various drive units being connected by virtue of a return force of the accelerator pedal that is increased at a corresponding point.

WO 2010/052236 A1 discloses an accelerator pedal with a zero return force at a specific speed.

The object of the invention is to indicate an action, for example a changeover from an electric driving mode to a driving mode using the internal combustion engine or deactivation of cylinder switch-off, to a driver in good time. More particularly, a motor vehicle driver should be informed at an early stage when a specific action is initiated in the drive train, for example deactivation of cylinder switch-off or a changeover from an electric driving mode to a driving mode using an internal combustion engine.

SUMMARY OF THE INVENTION

The invention relates to a method for operating a motor vehicle having at least one drive unit in the form of an internal combustion engine. The drive unit is actuated by an accelerator pedal. A control unit interacts with the accelerator pedal and haptic feedback indicates to a driver that a defined action is initiated and carried out in response to reaching an accelerator pedal travel associated with a specific power requirement that is transmitted to the control unit. This action causes a change in the driving mode. The haptic feedback is realized as idle travel defined in a characteristic curve that is stored in the control unit. The characteristic curve is for the accelerator pedal proceeding from the specific accelerator pedal travel. The control unit also is called the engine controller within the scope of the present description.

The accelerator pedal travel and the corresponding accelerator pedal angle at which the defined action is initiated is not fixed, but rather pre-specifies the associated power requirement that is transmitted to the control unit when the defined action is initiated and executed. The accelerator pedal angle at which the specific power requirement is transmitted to the control unit may vary depending on various vehicle parameters.

The haptic feedback, that is to say the feedback that can be felt, is realized by a defined idle travel in the characteristic curve of the accelerator pedal that is stored in the control unit. A pedal characteristic curve of this kind can be associated with an accelerator pedal and maps how a specific pedal travel or a pedal angle, as is set on the pedal by the driver pressing the pedal, affects driving of the vehicle. In addition to the characteristic curve that is stored in the control unit of the engine control system, a pedal force/pedal travel characteristic curve is pre-specified for each accelerator pedal. The pedal force/pedal travel characteristic curve indicates how a specific pedal travel or pedal angle affects a return force that is reproduced by the pedal. Thus, a driver who presses the accelerator pedal feels a resistance by the accelerator pedal depending on the pedal angle. This resistance is generated by the return force provided by the accelerator pedal. Therefore, the return force is virtually the force that is felt directly by the driver when he presses the accelerator pedal. However, the accelerator pedal no longer is connected directly or mechanically to the drive by a mechanical linkage in modern motor vehicles, but rather the accelerator pedal position is detected and converted into an electrical signal which, in turn, is passed to the control unit as an input variable. Feedback in the form of a return force of the accelerator pedal is not necessarily coupled directly to an effect of the accelerator pedal position on the control system of the corresponding drive unit. Rather, operation of the accelerator pedal transmits a specific power requirement to the control unit in the form of an electrical signal and causes a change in the driving mode. This change can be made to be felt or identified by the driver by virtue of a defined change, specifically idle travel, in the characteristic curve of the accelerator pedal, which is stored in the control unit.

A defined action that is initiated and carried out if the accelerator pedal is depressed as far as a specific pedal angle or a specific pedal travel, is, for example, deactivation of cylinder switch-off in the case of a motor vehicle with an internal combustion engine, or a changeover from an electric driving mode to a driving mode using an internal combustion engine in the case of a hybrid vehicle with an internal combustion engine and an electric motor. Thus, the defined action may be a changeover between driving using an electric motor and driving using an internal combustion engine if the vehicle has a drive unit in the form of an electric motor.

The defined action may be initiated and executed when the power requirement transmitted to the control unit by the specific operation of the accelerator pedal exceeds a pre-specified threshold. Thus, the pre-specified threshold for a changeover between driving using the electric motor and driving using the internal combustion engine may be a power limit of the electric motor. Alternatively, the pre-specified threshold for a motor vehicle that is to be driven only using an internal combustion engine may be a power limit of a cylinder switch-off means.

The invention also relates to an apparatus for operating a motor vehicle having at least one drive unit in the form of an internal combustion engine and that is actuated by an accelerator pedal and a control unit that interacts with the accelerator pedal. The apparatus provides a haptic feedback to a driver upon reaching an accelerator pedal travel associated with a specific power requirement that is transmitted to the control unit and thus indicates that a defined action is initiated and carried out. This action causes a change in the driving mode so that the haptic feedback is realized as idle travel defined in a characteristic curve stored in the control unit of the accelerator pedal proceeding from the specific accelerator pedal travel.

The defined action may be a switch-on operation of at least one cylinder of the internal combustion engine. Thus, the corresponding cylinder switch-off operation is deactivated.

The defined action may be a changeover between driving using the electric motor and driving using the internal combustion engine if the vehicle also has a drive unit in the form of an electric motor.

The defined idle travel may be configured so that there is no noticeable vehicle response over a specific accelerator pedal angle interval when the accelerator pedal is pressed starting from a specific accelerator pedal position. The driver will identify this "idle travel" from the driving feel and will understand that a specific action will be initiated and carried out. For example, a characteristic curve of the accelerator pedal in the engine controller may be changed over if the driver has depressed the accelerator pedal to such an extent that the power limit of the electric motor or of the cylinder switch-off means is reached. The driver will perceive the idle travel of the accelerator pedal as a feedback indicating that an action will be performed when the accelerator pedal is depressed further. The action may be starting the internal combustion engine of a hybrid vehicle or deactivating the cylinder switch-off means after the driver overcomes the idle travel has been overcome by the. As a result, the driver is given information in a simple manner. Furthermore the invention merely requires a change in the pedal characteristic curve in the engine controller or the control unit, and therefore a mass-produced accelerator pedal can be used. The defined action is initiated only when the idle travel has been overcome, the driver still has the opportunity to suppress initiation and implementation of the defined action by "releasing" the accelerator pedal.

Various dependencies generally are stored in the engine controller. For example, a relationship between an accelerator pedal position and an electrical signal that is to be transmitted to the control unit is stored. The electrical signal that is forwarded to the engine controller as a function of the accelerator pedal position always behaves linearly in relation to the accelerator pedal position. This electrical signal that is forwarded to the engine controller now is converted as a function of a relationship that is stored in the engine controller into an activation signal that is forwarded to the engine or to the drive. To this end, the controller stores a relationship that converts an electrical input signal to the engine controller into an actuation signal that is an output variable of the engine controller. This relationship corresponds to the pedal characteristic curve that is stored in the engine controller or the control unit. The actuation signal, in turn, is related to the vehicle response and therefore to a driving feel that is received by the driver when the driver presses the pedal. That is to say, the haptic feedback received by the driver when the driver presses the accelerator pedal is the vehicle response and the associated driving feel.

The features cited above and those still to be explained below can be used in in the indicated combination and also in other combinations or on their own, without departing from the scope of the invention.

The invention is illustrated schematically in the drawings using exemplary embodiments and will be explained in detail with reference to the drawings.

DETAILED DESCRIPTION OF THE PREFERRED EMBODIMENTS

Figure 4:
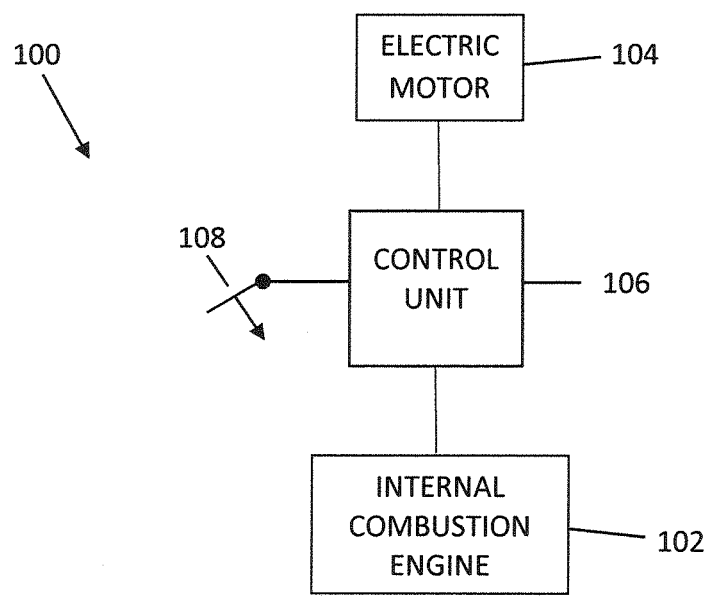
FIG. 4 is a schematic illustration of a motor vehicle in accordance with the invention.

FIG. 4 schematically illustrates a hybrid motor vehicle 100 with an internal combustion engine 102, an electric motor 104, a control unit 106 and an electronic accelerator pedal 108. The control unit 106 receives signals from the accelerator pedal 108 and controls the internal combustion engine 102 and/or the electric motor 104 based partly upon the position of the accelerator pedal 108 set by the driver. For example, the control unit 106 can initiate a changeover from an electric driving mode by the electric motor to a drive at least partly by the internal combustion engine 102 when power needs set by the accelerator pedal 108 cannot be met merely by the electric motor 104. The control unit 106 also can deactivate a switch-off of at least one cylinder of the internal combustion engine 102 so that all cylinders become active to meet power demands set by the position of the accelerator pedal 108. The control unit 106 also controls restoring forces of the accelerator pedal 108 in accordance with stored relationships between pedal angle and restoring forces. As explained herein, the restoring forces of the accelerator pedal 108, as controlled by the control unit 106, are used to provide haptic feedback to the driver of imminent changes in the driving mode.

Figure 1:
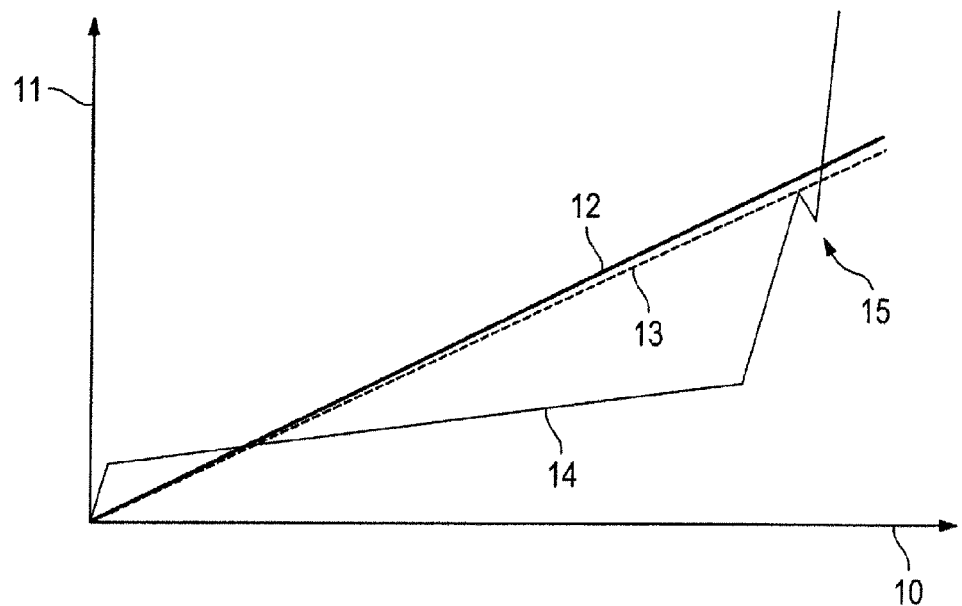
FIG. 1 shows various dependencies between the pedal angle or pedal travel and pedal force and electrical signal, as is known from the prior art.
Figure 2:
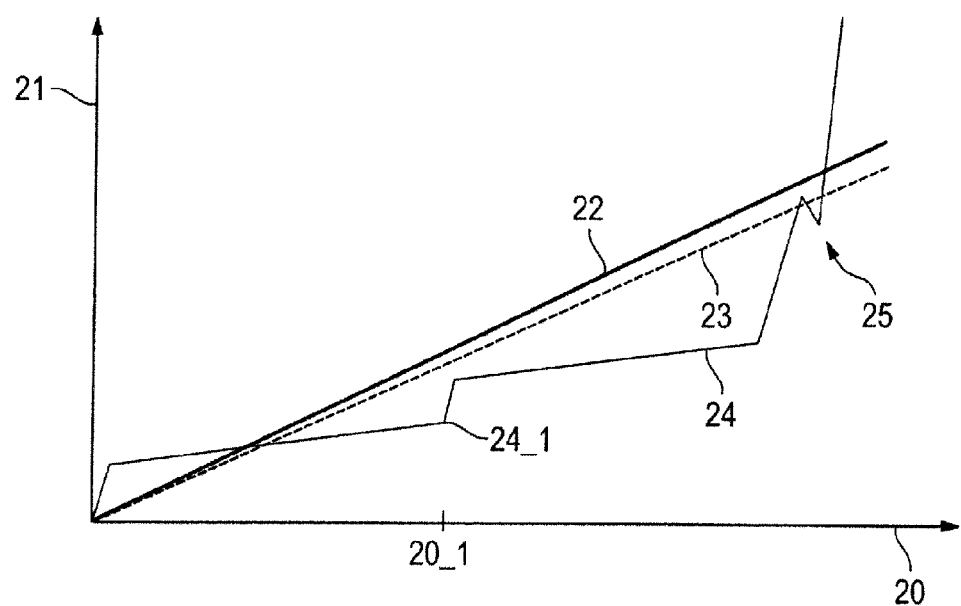
FIG. 2 shows characteristic dependencies that correspond to FIG. 1, for an accelerator pedal with haptic feedback.

FIG. 1 shows characteristic dependencies for an accelerator pedal as is known from the prior art. A pedal angle or pedal travel is plotted on an abscissa 10. A pedal return force and an electrical signal that is to be transmitted to a controller or a control unit, is plotted on an ordinate 11. A dependency between the pedal angle and the electrical signal that is forwarded to an engine controller or a control unit as an input variable is shown using curve 12. The electrical signal that is to be forwarded to the engine controller exhibits a linear dependency to the pedal angle or the pedal position. An electrical signal that can be read off from the curve 12, is transmitted to the engine controller as an input variable depending on the accelerator pedal angle position. The engine controller in turn internally converts the electrical input signal that enters the engine controller into an actuation signal that ultimately actuates the drive of the motor vehicle. A curve 13 shows the resulting linear dependency of the actuation signal on the pedal angle in accordance with the prior art. Curve 13 directly reflects the effect of the pedal angle on the actuation signal, which acts directly on the drive of the motor vehicle. Curve 14 shows a pedal force/pedal travel characteristic curve, that is to say a dependency between the pedal angle, as is set by a driver by pressing the pedal, and a return force which is fed back to the driver by the pedal, that is to say a force or a resistance as felt by the driver when pressing the pedal. After an initially suddenly increasing return force from zero to a specific starting value, the force/travel characteristic curve runs very flat and first exhibits a sudden zigzag-like jump 15 at kickdown when the vehicle is driven at full power FIG. 2 shows characteristic profiles of an accelerator pedal when haptic feedback is provided. The pedal angle or pedal travel again is plotted on an abscissa 20. The pedal force and the electrical signal again are plotted on an ordinate 21. A curve 22 shows the dependency between the pedal angle and an electrical signal that serves as an input variable for an engine controller. Similar to the curve 12 shown in FIG. 1, the curve 22 runs in a straight line from the origin and accordingly exhibits an exactly linear profile, with a linear dependency between the electrical signal as the input variable to the engine controller and the accelerator pedal position. The curve 23 shows a dependency between the actuation signal that functions directly to actuate the drive of the motor vehicle and the pedal position. The curve 23 can be derived from the curve 22, and the actuation signal virtually reflects the output signal from the engine controller. The curve 24 shows a pedal force/pedal travel characteristic curve. Similar to FIG. 1, the curve 24 also exhibits a very flat profile as far as a jump 24_1 after an initial sudden increase. At jump 24_1, that is to say at a specific pedal angle 20_1, the return force increases suddenly, with the result that the driver suddenly feels a relatively strong resistance at this point. A change in the driving mode, such as a changeover from electric driving to driving using an internal combustion engine, or deactivation of switch-off of at least one cylinder of the internal combustion engine, is made in the engine controller precisely at the point defined by the pedal angle 20_1. The dependency between the actuation signal and the pedal angle shown by curve 23 has no change here since the actuation signal changes linearly and is associated with a changeover in the manner of driving or the driving mode only internally. However, the jump 24_1 arises in the characteristic curve 24 so that this change in driving can be identified by the driver. More particularly, the driver receives haptic feedback and knows that a changeover takes place precisely at this point 20_1 and he can identify that a changeover is made, for example, from electric driving to driving by internal combustion engine here. The driver receives further haptic feedback again only in the event of the kickdown, which also is illustrated in FIG. 1, when the engine is operated at full power and the driver receives feedback in the form of the suddenly increasing return force by a type of zigzag jump 25.

Figure 3:
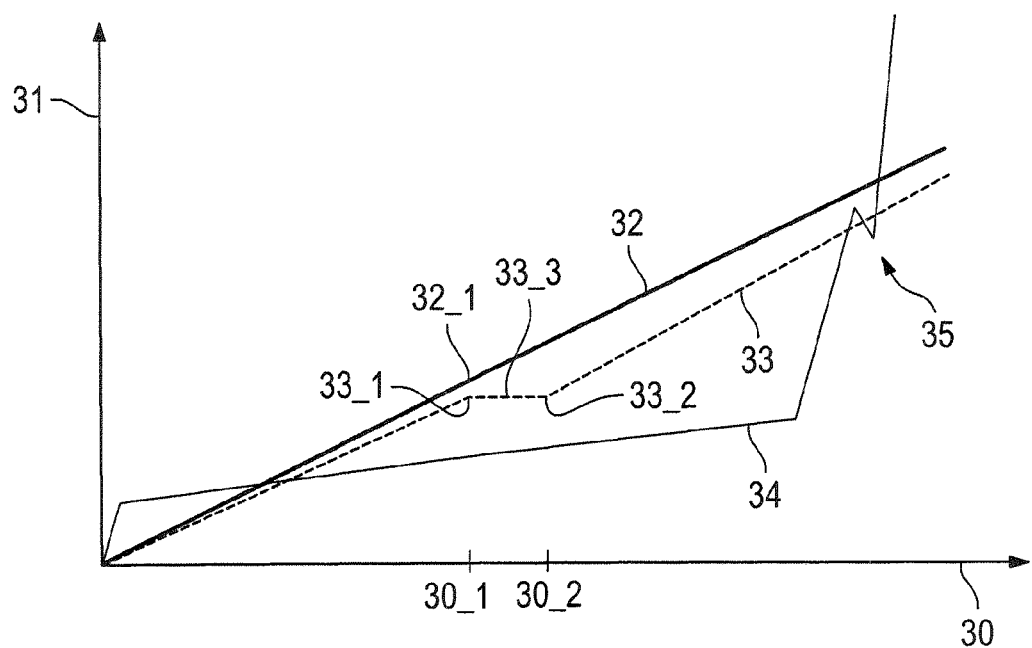
FIG. 3 shows characteristic dependencies for an accelerator pedal with idle travel provided according to the invention as haptic feedback.

FIG. 3 shows characteristic profiles of an accelerator pedal in an embodiment of the method according to the invention. A pedal angle or a pedal travel again is plotted on an abscissa 30. A pedal force and an electrical signal are plotted on an ordinate 31. The curve 32 again shows the dependency between an electrical signal as an input signal for an engine controller and the pedal angle or the pedal position. Exactly as in FIGS. 1 and 2, a linear dependency exists with the electrical signal increasing uniformly as a function of the pedal angle. A curve 33 illustrates a pedal characteristic curve and shows a dependency between the drive signal and the pedal angle. As explained above, the drive signal is the signal that ultimately is forwarded from the engine controller to drive units of the motor vehicle and is converted by the drive. The specific angular position 30_1 produces an electrical input signal 32_1 for the engine controller that causes a power threshold to be exceeded and accordingly a change in the driving mode has to take place in the motor vehicle. A change in driving mode of this kind can be either a changeover from electric driving to driving using an internal combustion engine or deactivation of switch-off of at least one cylinder of the internal combustion engine. In the normal case, as can be seen in FIG. 1, a changeover of this kind or a change in driving mode cannot be identified by a driver on the basis of a force/travel characteristic curve of the pedal. The force/travel characteristic curve is shown FIG. 3 by the curve 34. The curve 34 indicates the dependency between the pedal angle and the pedal return force can be felt by the driver. A change in driving is necessary if a power threshold is exceeded at pedal angle 30_1. However, the drive signal is held constant in an unchanged state, that is to say the value of the drive signal does not change between 33_1 and 33_2 and remains at a plateau 33_3, for a specific time interval [30_1, 30_2]. This idling in the pedal characteristic curve 33 allows the driver to feel that the vehicle reaction and the associated driving feel does not change despite the pedal being depressed further. As a result, the driver receives haptic feedback and, in this angular region, can still make a decision in the short-term as to whether he desires the imminent change in driving or, instead, again reduces the pedal angle so that the manner of driving remains the same. The change in driving is performed and the drive signal again increases linearly with the pedal travel only after this idle section, that is to say the pedal angle interval [30_1, 30_2] has been passed. The angle interval extends, for example, over 1°. Comparing FIGS. 2 and 3 shows that the profile of the drive signal at point 33_1 has been interrupted for a moment, that is to say when passing through pedal angle interval [30_1, 30_2], and then is restarted at point 33_2. This makes it possible for a mass-produced accelerator pedal to continue to be used, wherein there is only a change in the pedal characteristic curve in the engine controller. Similar to in FIGS. 1 and 2, a kickdown can again be identified here, as shown by a zigzag increase in the force/travel characteristic curve 34 at point 35.

What is claimed is:

1. A method for operating a hybrid motor vehicle having at least one drive unit that includes an electric motor and an internal combustion engine, the drive unit being actuated by an accelerator pedal and a control unit that stores characteristic curves that associate driving mode with accelerator pedal travel, the method comprising:
   sensing driver-generated accelerator pedal travel information;
   using the characteristic curves stored in the control unit for determining a specific power requirement associated with the accelerator pedal travel caused by the driver;
   determining whether the specific power requirement determined by the accelerator pedal travel necessitates a defined action to change a driving mode; and
   providing a first haptic feedback signal to the driver in the form of idle travel of the vehicle defined in one of the characteristic curves stored in the control unit so that there is no noticeable vehicle response when the necessitated change in driving mode occurs during a first specified range of accelerator pedal positions, and providing a second haptic feedback signal to the driver in the form of a sudden increase in pedal return force defined by one of the characteristic curves stored in the control unit to generate a driver-perceptible increase in accelerator pedal resistance when the necessitated change in the driving mode occurs during a second range of accelerator pedal positions, wherein the first and second haptic feedback signals indicate to the driver that further driver-generated accelerator pedal travel will cause a change in the driving mode.

2. The method of claim 1, wherein the defined action is initiated and executed when the specific power requirement transmitted to the control unit by the accelerator pedal travel equals or exceeds a pre-specified threshold.

3. The method of claim 2, wherein the pre-specified threshold is pre-specified by a power limit of the electric motor.

4. The method of claim 2, wherein the pre-specified threshold is pre-specified by a power limit of a cylinder switch-off means of at least one cylinder of the internal combustion engine.

5. A hybrid motor vehicle comprising:
   at least one drive unit that includes an electric motor and an internal combustion engine;
   an accelerator pedal for actuating the drive unit;
   a control unit that: stores characteristic curves that associate driving mode with accelerator pedal travel; interacts with the accelerator pedal and the drive unit for determining a power requirement for the drive unit based on accelerator pedal travel; and initiates and carries out a defined action associated with a specific power requirement, the defined action being selected from activation of the internal combustion engine and deactivation of a switch-off of at least one cylinder of the internal combustion engine; and
   a haptic feedback mechanism associated with the accelerator pedal and the control unit to provide a first or second haptic feedback signal to a driver to indicate to the driver that further accelerator pedal travel is associated with the specific power requirement that necessitates the defined action, the first haptic feedback signal to the driver being in the form of idle travel of the vehicle defined in one of the characteristic curves stored in the control unit so that there is no noticeable vehicle response when the necessitated change in driving mode occurs during a first specified range of accelerator pedal positions, and the second haptic feedback signal being a sudden increase in pedal return force defined by one of the characteristic curves stored in the control unit so that a driver-perceptible increase in accelerator pedal resistance occurs when the necessitated change in driving mode occurs during a second specified range of accelerator pedal positions, the first and second haptic feedback signals indicate to the driver that further accelerator pedal travel will cause the defined action.

6. A method for operating a hybrid motor vehicle having at least one drive unit that includes an electric motor and an internal combustion engine, the drive unit being actuated by an accelerator pedal and a control unit that stores characteristic curves that associate driving mode with accelerator pedal travel, the method comprising:
   sensing driver-generated accelerator pedal travel information;
   using the characteristic curves stored in the control unit for determining a specific power requirement associated with the accelerator pedal travel caused by the driver;
   determining whether the specific power requirement determined by the accelerator pedal travel necessitates a defined action in the form of a deactivation of a switch-off of at least one cylinder of the internal combustion engine to change a driving mode; and
   providing a haptic feedback signal to the driver to indicate to the driver that further accelerator pedal travel is associated with the specific power requirement that necessitates the defined action in the form of the deactivation of a switch-off of at least one cylinder of the internal combustion engine to change the driving mode, the haptic feedback signal being at least one of an idle travel of the vehicle defined in one of the characteristic curves stored in the control unit so that there is no noticeable vehicle response to further accelerator pedal travel or a sudden increase in pedal return force defined by one of the characteristic curves stored in the control unit so that a driver-perceptible increase in accelerator pedal resistance occurs, wherein the haptic feedback signals indicate to the driver that further accelerator pedal travel will cause the defined action.

7. The method of claim 6, wherein the haptic feedback signal in the form of idle travel of the vehicle defined in one of the characteristic curves stored in the control unit so that there is no noticeable vehicle response to further accelerator pedal travel occurs in a first specified range of accelerator positions and wherein the haptic feedback signal in the form of a sudden increase in pedal return force defined by one of the characteristic curves stored in the control unit so that there is a driver-perceptible increase in accelerator pedal resistance occurs in a second specified range of accelerator pedal positions.

8. The method of claim 7, wherein the second specified range of accelerator positions corresponds to a drive signal for producing greater power than the first specified range of accelerator pedal positions.

9. The method of claim 1, wherein the second specified range of accelerator pedal positions corresponds to a drive signal for producing greater power than the first specified range of accelerator pedal positions.

10. The method of claim 1, wherein the defined action is deactivation of a switch-off of at least one cylinder of the internal combustion engine to change a driving mode.

11. The method of claim 1, wherein the defined action is activation of the internal combustion engine to change a driving mode.

12. The hybrid motor vehicle of claim 5, wherein the second specified range of accelerator pedal positions corresponds to a drive signal for producing greater power than the first specified range of accelerator pedal positions.

13. The hybrid motor vehicle of claim 5, wherein the defined action is deactivation of a switch-off of at least one cylinder of the internal combustion engine to change a driving mode.

14. The hybrid motor vehicle of claim 5, wherein the defined action is activation of the internal combustion engine to change a driving mode.

* * * * *